United States Patent [19]

Aeschliman

[11] 4,002,831

[45] Jan. 11, 1977

[54] CONSOLE CABINET FOR PORTABLE TELEVISION RECEIVER

[75] Inventor: Eugene Aeschliman, Jackson, Miss.

[73] Assignee: DeSoto, Inc., Des Plaines, Ill.

[22] Filed: Mar. 29, 1976

[21] Appl. No.: 671,291

[52] U.S. Cl. .............................. 358/254; 312/7 TV
[51] Int. Cl.² ......................................... H04M 5/64
[58] Field of Search ........................... 178/7.9, 7.91; 312/7 TV, 204, 292

[56] References Cited

UNITED STATES PATENTS 3,294,905   12/1966   Tomassen ............................ 178/7.9
3,761,152   9/1973    Cory ................................. 312/7 TV

*Primary Examiner*—Robert L. Griffin
*Assistant Examiner*—Edward L. Coles
*Attorney, Agent, or Firm*—Arnstein, Gluck, Weitzenfeld & Minow

[57] ABSTRACT

A console cabinet for a portable television receiver comprising a base, a top, open front and rear sides, and sidewalls attached to said base and terminating at said top has vertical adjustment receiver support means disposed above said base and open front closure means whereby when the portable receiver is inserted in the cabinet on said adjustment means and said closure means frames the receiver, a floor console model is obtained.

10 Claims, 9 Drawing Figures

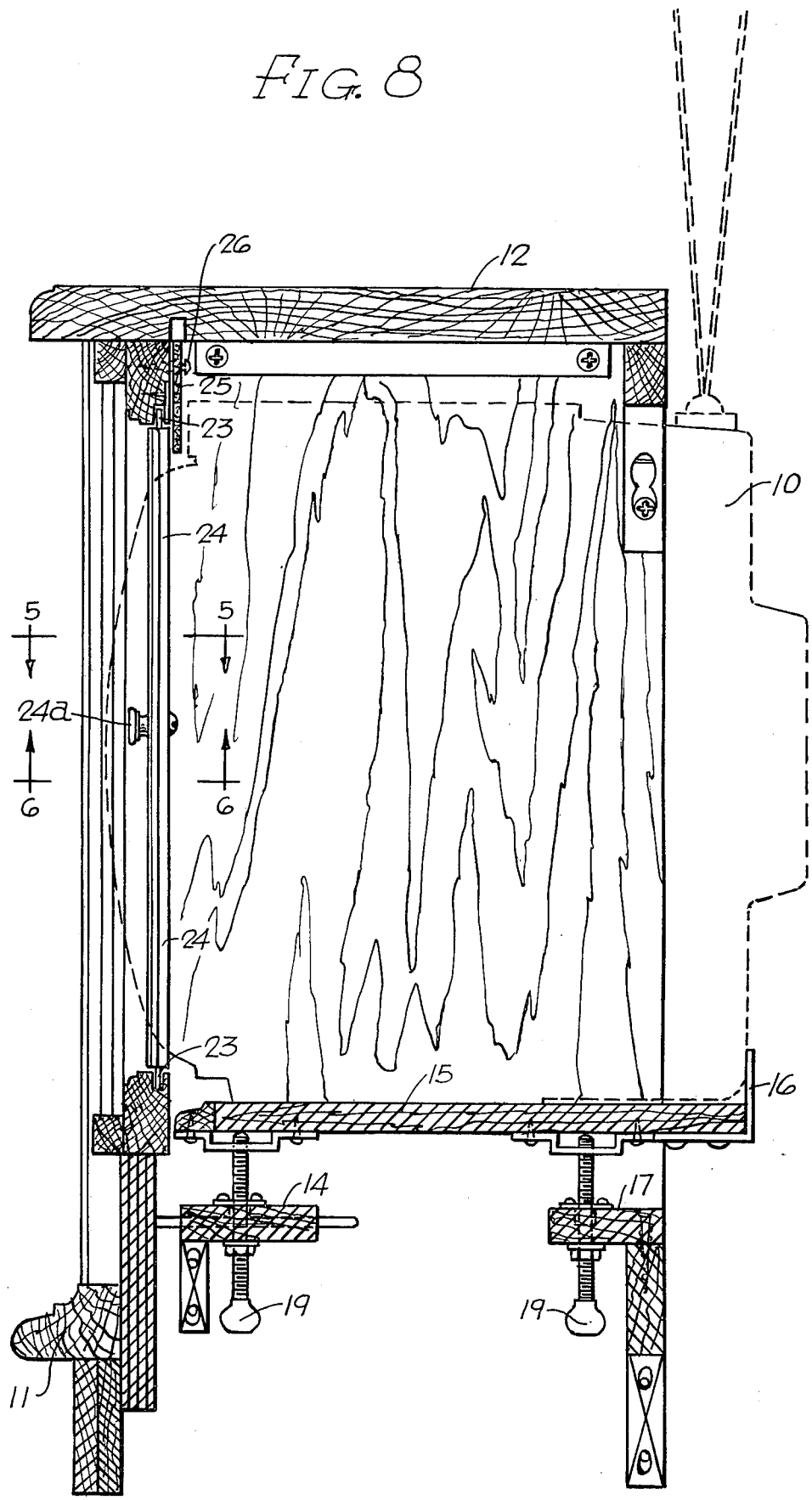

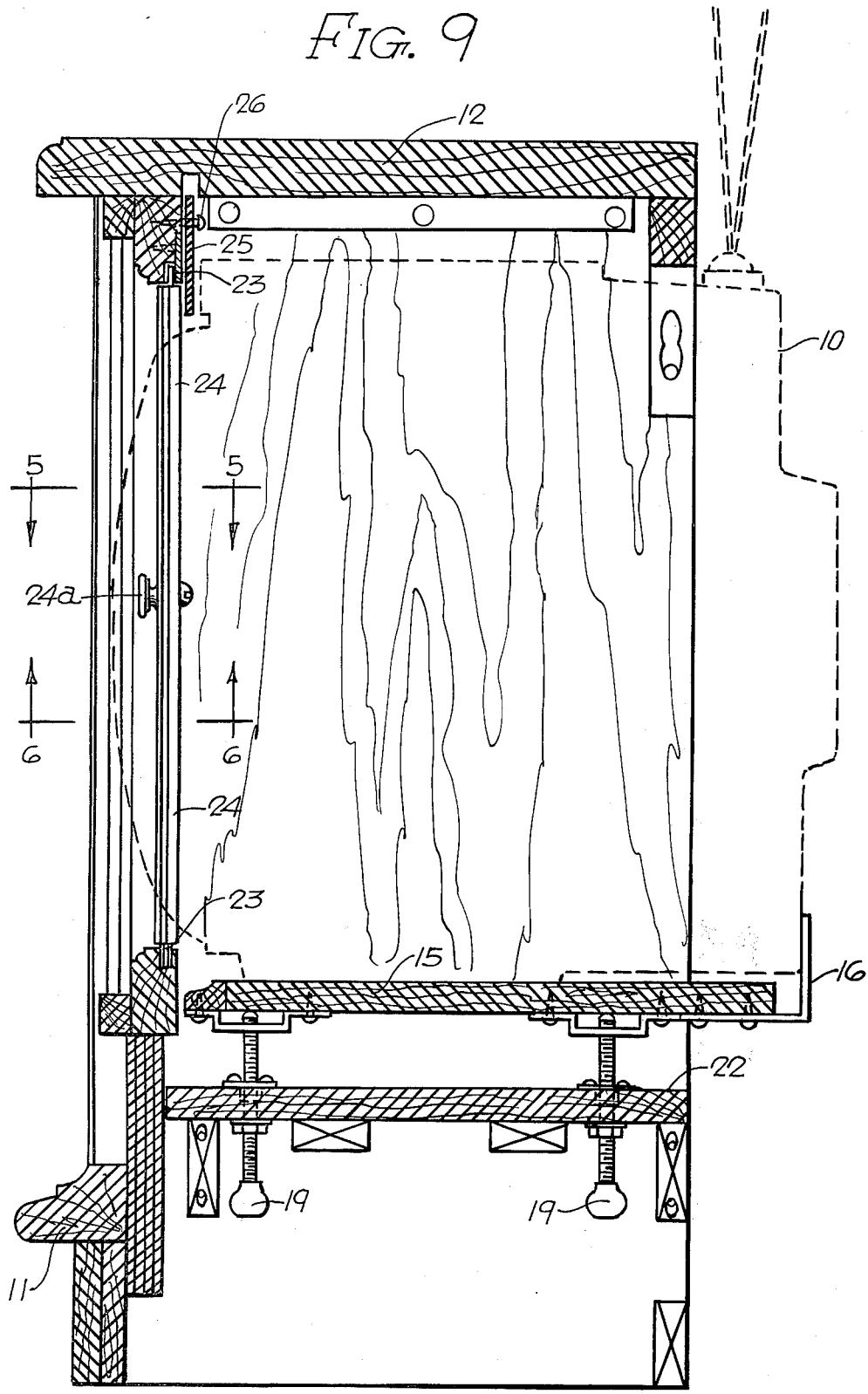

CONSOLE CABINET FOR PORTABLE TELEVISION RECEIVER

BACKGROUND OF THE INVENTION

This invention relates to a console cabinet for a portable television receiver which may be constructed from, for example, molded or extruded plastic components or may be made completely of wood. The console cabinet includes a base, a top, open front and rear sides, a pair of sidewalls attached to the base and terminating at the top, and vertical adjustment receiver support means and open front closure means for, respectively, vertically adjusting the portable receiver upwards or downwards in the cabinet and for framing the receiver to obtain a floor console model. More particularly, this invention relates to a console cabinet which permits the owner of most 19 through 23 inch portable and table television models to convert these models into high fashion furniture consoles. The invention is such that the entire conversion from a portable or table model set into a console type set can be accomplished very quickly and easily with the type of tools that most homeowners have. Thus, the present invention provides a high fashion furniture console for a portable receiver which is capable of being installed with a minimum amount of effort and a minimum amount of tools.

SUMMARY OF THE INVENTION

Therefore, it is an object of this invention to provide a console cabinet for a portable television receiver. It is a further object of this invention to provide this console cabinet for a wide variety of portable and table model television receivers. For purposes of this invention, the term "portable and table television model" is herein defined as "portable television receiver."

It is another object of this invention to provide a console cabinet that will allow a do-it-yourselfer to install the same with a minimum of time and effort with a minimum of tools required to create a professional result.

It is a specific object of this invention to provide a console cabinet having vertical adjustment receiver support means disposed above the base of the cabinet and open front closure means permitting partial closure of the front of the cabinet so that when the receiver is inserted in the cabinet on the adjustment means, and adjusted upwards or downwards in said cabinet, and the closure means frames the receiver, a floor console model is obtained.

Therefore, the present invention provides a console cabinet for a portable television receiver, said cabinet comprising, in combination: a base, a top, open front and rear sides, and a pair of sidewalls attached to said base and terminating at said top; supporting means disposed in a lower portion of said cabinet positioned for holding in a generally horizontal position vertical adjustment receiver support means disposed above said base wherein the entirety of said adjustment means overlies said base, and the upper side of said adjustment means receives said receiver; and, open front closure means disposed over said base and between said sidewalls and top permitting partial closure of said open front whereby when the receiver is inserted in said cabinet on said adjustment means, and adjusted upwards or downwards in said cabinet, and said closure means frames said receiver, a floor console model is obtained.

In addition, the present provides a console cabinet for a portable television receiver, said cabinet comprising, in combination: a base, a top, open front and rear sides, and a pair of sidewalls attached to said base and terminating at said top; supporting means on said sidewalls for holding in a generally horizontal position vertical adjustment receiver support means disposed above said base wherein the entirety of said adjustment means overlies said base, and the upper side of said adjustment means receives said receiver; a plurality of guide means on said base and under said top for guiding flexible panel means in selective horizontal sliding movement over said base member and between said sidewalls and top to close at least a portion of said open front side and to engage side surfaces of said receiver; and, adjustment strip means disposed under said top to close the remaining portion of said open front side and to engage an upper surface of said receiver whereby when the portable receiver is inserted in said cabinet on said vertical adjustment means, and adjusted upwards or downwards in said cabinet, and said flexible panel means and adjustment strip means are engaged in position with said receiver, a floor console model is obtained.

The invention can be most clearly described and illustrated with reference to the attached drawings which are representations of specific embodiments of my invention.

BRIEF DESCRIPTION OF THE DRAWINGS

Referring now to the drawings forming a part of the specification and illustrating preferred embodiments of my invention.

FIG. 8 is an enlarged detail cross-sectional view taken substantially along the line 8—8 of FIG. 2; and, FIG. 9 is an enlarged detail cross-sectional view taken substantially along the line 9—9 of FIG. 4.

BRIEF DESCRIPTION OF A PREFERRED EMBODIMENT

Referring now generally to the drawings, the numeral 10 denotes, in general, a portable television receiver, as defined herein. The invention comprises a console cabinet for such a portable television receiver said cabinet comprising, in combination, a base 11, a top 12, unnumbered open front and rear sides, and a pair of sidewalls 13, which include a small section, on each sidewall, which partially close the open front of said cabinet. The base, top, and pair of sidewalls are attached to said base 11 and terminate at top 12 of said cabinet.

Various types of fastening and reinforcing means may be provided throughout the cabinet and these may include, for example, pegs, nails, screws, glue, and the like, depending on whether or not the cabinet is made of wood or a molded or extruded plastic material. In addition, the cabinet may be provided with various frame supports and these may include various alignment means, not shown, to properly line up the various parts of the cabinet.

Figure 1:
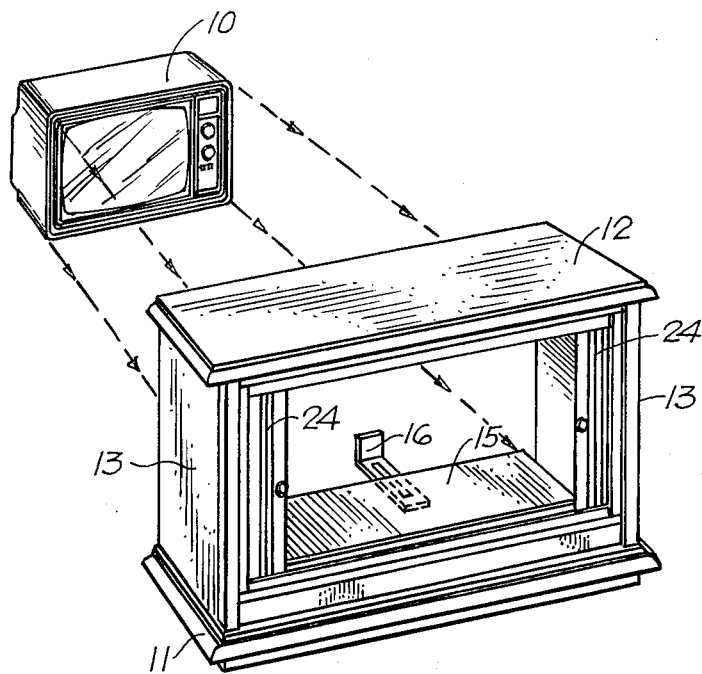
FIG. 1 is a perspective view of the cabinet of this invention showing how a portable television receiver may be oriented therein.
Figure 2:
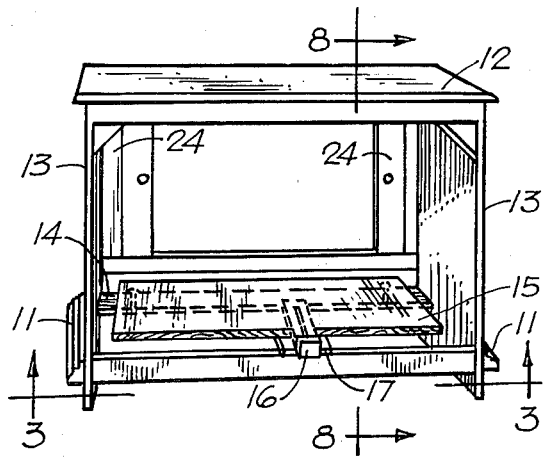
FIG. 2 is a back elevation view of the cabinet shown in FIG. 1.
Figure 3:
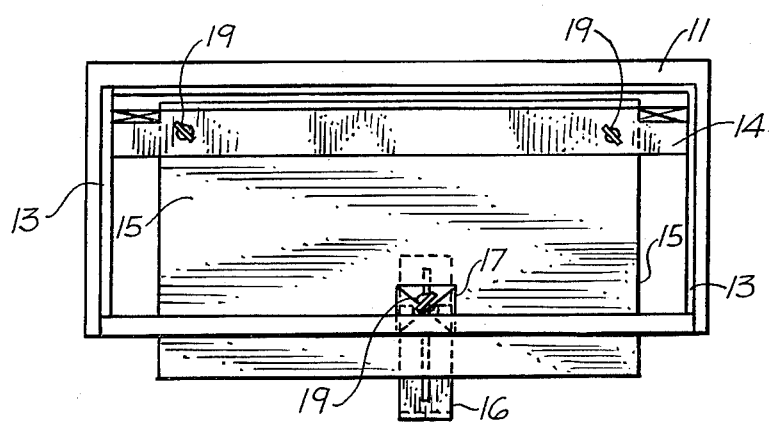
FIG. 3 is an enlarged detail cross-section taken substantially along the line 3—3 of FIG. 2.

Referring to FIGS. 2, 3, and 8, with respect to one of the preferred embodiments, supporting means 14 and 17 are disposed in the lower portion of the cabinet positioned for holding in a generally horizontal position vertical adjustment receiver support means 15 disposed above said base 11 wherein the entirety of said adjustment means 15 overlies said base, and the upper side of said adjustment means 15 receives said receiver 10.

As is shown particularly in FIGS. 3 and 8, the vertical adjustment receiver support means 14 and 17 includes a plurality of adjustable thumbscrew means 19, here three, disposed perpendicularly between said supporting means 14 and 17 and said receiver support means 15. In addition, said vertical adjustment receiver support means 15 may include television retainer means 16 mounted thereon, which may be adjustable.

Figure 7:
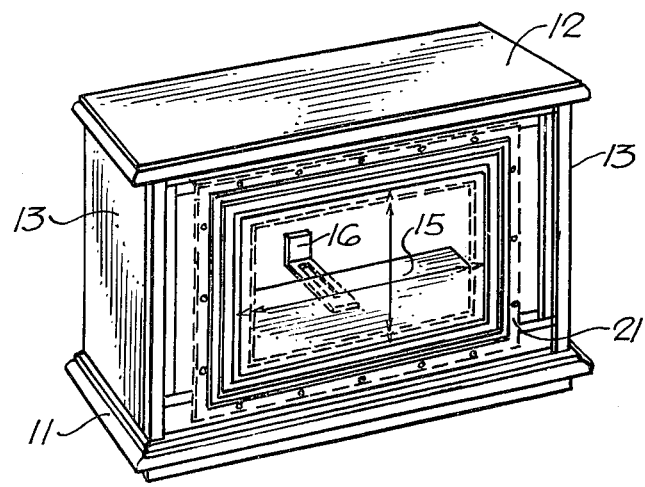
FIG. 7 is a perspective view of the console cabinet displaying a preferred embodiment of the open front closure means.

As is shown in FIG. 7, open front closure means 21, preferably frame means, particularly a frame, is disposed over said base 11 and between said sidewalls 13 and top 12 permitting partial closure of said open front whereby when receiver 10 is inserted in the cabinet on said adjustment means 15, and adjusted upwards or downwards in said cabinet, and said closure means frames said receiver, a floor console model cabinet is obtained.

Figure 4:
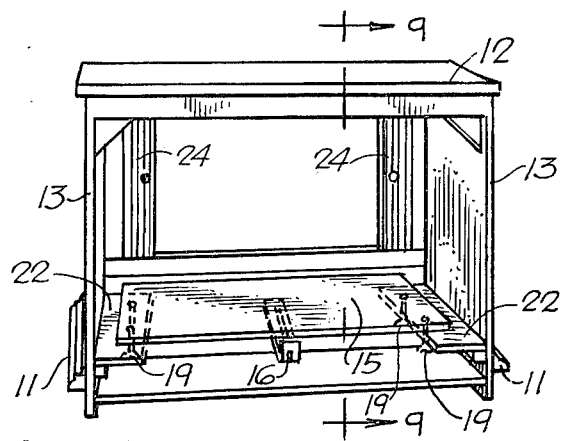
FIG. 4 is a back elevation view displaying a particularly preferred method of supporting the vertical adjustment receiver support means.
Figure 5:
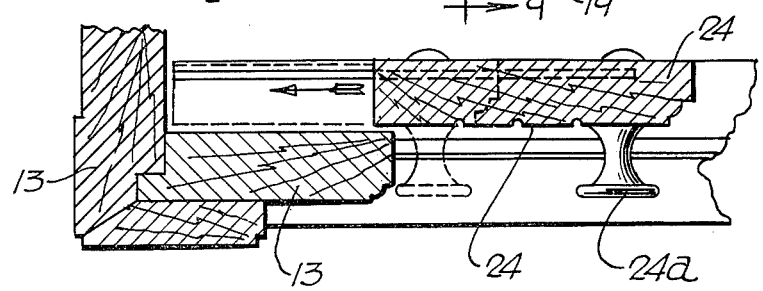
FIG. 5 is an enlarged detail cross-section taken substantially along the line 5—5 of FIG. 8.
Figure 6:
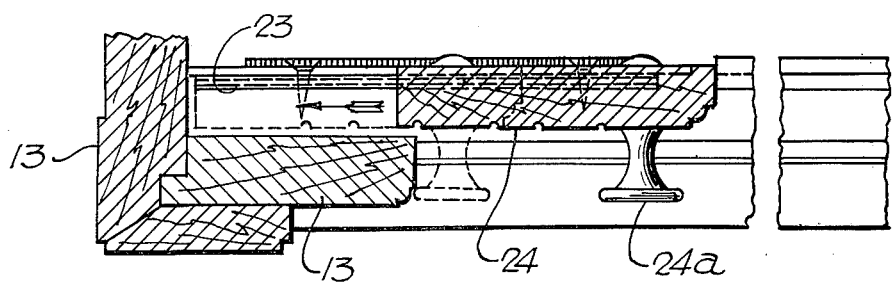
FIG. 6 is an enlarged detail cross-section taken substantially along the line 6—6 of FIG. 8.

In still another preferred embodiment of my invention, as is particularly shown in FIGS. 4 and 9, the console cabinet having base 11, top 12, unnumbered open front and rear sides, and sidewalls 13 including the small section of sidewall partially closing said open front side terminate at top 12 as described hereinbefore. However, supporting means 22 on said sidewalls 13 may be provided for holding in a generally horizontal position vertical adjustment receiver support means 15 disposed above said base 11 wherein the entirety of the adjustment means 15 overlie said base and the upper side of adjustment means 15 receives the receiver 10. A plurality of adjustable thumbscrew means 29, here four, may be provided, as is shown.

In addition, a plurality of guide means 23 may be provided on said base and under said top for guiding flexible panel means 24 in selective horizontal sliding movement over said base member and bwtween said sidewalls and top to close at least a portion of said open front side and to engage the side surfaces of television receiver 10. In a particularly preferred embodiment, said flexible panel means 24 may comprise a tambour. The tambour in essence is a roll top formed of connected articulated sections which has longitudinally extending grooves in one surface and is spaced from each side edge as is illustrated. The leading edge of the tambour may be provided with decorative hardware 24a or the like for effecting movement of the tambour to its closed position around the television receiver.

Adjustment strip means 25 may be disposed under top 12 to close the remaining portion of said open front side of the cabinet using screw 26 and engages an upper surface of television receiver 10. This is particularly shown in FIGS. 8 and 9. When the portable receiver is thus inserted in said cabinet on vertical adjustment means 15, and adjusted upwards or downwards in said cabinet, and said flexible panel means 24 and adjustment strip means 25 are engaged in position with said receiver 10, a floor console model is obtained. It is contemplated that the adjustment strip means 25 will be furnished to the user in three different width strips so as to accommodate a wide variety of television receivers and to insure a good fit. In addition, after the television installation has been completed, it will be suggested to the user that the adjustable means 15 be adjusted via, for example, thumbscrew means 19 to slightly tilt the adjusting means to, for example, a 2° to 4° forward tilt so as to keep the television receiver snugged up to the front edge of the cabinet.

It also contemplated that this cabinet may be assembled in such fashion as to permit the shipping, storage and the like in a so-called "knocked-down" condition. This version of the cabinet would allow the prospective purchaser to easily hand-carry the merchandise away from the store that he purchases it from and, in addition, would save valuable warehouse space and reduce transportation costs due to bulk shipping.

PREFERRED EMBODIMENTS

In a particularly preferred embodiment of my invention, this invention provides a console cabinet for a portable television receiver said cabinet comprising in combination: a base, a top, open front and rear sides, and a pair of sidewalls attached to said base and terminating at said top; supporting means disposed in a lower portion of said cabinet positioned for holding in a generally horizontal position vertical adjustment receiver support means including a plurality of adjustable thumbscrew means disposed perpendicularly between said supporting means and said receiver support means and includes television retainer means mounted thereon, said receiver support means being disposed above said base wherein the entirety of said adjustment means overlies said base, and the upper side of said adjustment means receives said receiver; and, open front closure means comprising frame means disposed over said base and between said sidewalls and top permitting partial closure of said open front whereby when the receiver is inserted in said cabinet on said adjustment means, and adjusted upwards or downwards in said cabinet, and said frame means frames said receiver, a floor console model is obtained. Still another particularly preferred embodiment of my invention provides a console cabinet for a portable television receiver, said cabinet comprising, in combination: a base, a top, open front and rear sides, and a pair of sidewalls attached to said base and terminating at said top; supporting means on said sidewalls for holding in a generally horizontal position vertical adjustment receiver support means including a plurality of adjustable thumbscrew means disposed perpendicularly between said supporting means on said sidewalls and said receiver support means and includes television receiver retainer means mounted thereon, said receiver support means disposed above said base wherein the entirety of said adjustment means overlies said base, and the upper side of said adjustment means receives said receiver; a plurality of guide means on said base and under said top for guiding flexible panel means comprising a tambour in selective horizontal sliding movement over said base member and between said sidewalls and top to close at least a portion of said open front side and to engage side surfaces of said receiver; and, adjustment strip means disposed under said top to close the remaining portion of said open front side and to engage an upper surface of said receiver whereby when the portable receiver is inserted in said cabinet on said vertical adjustment means, and adjusted upwards or downwards in said cabinet, and said flexible panel means and adjustment strip means are engaged in position with said receiver, a floor console model is obtained.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim as my invention:

1. A console cabinet for a portable television receiver, said cabinet comprising, in combination:
    a. a base, a top, open front and rear sides, and a pair of sidewalls attached to said base and terminating at said top;
    b. supporting means disposed in a lower portion of said cabinet positioned for holding in a generally horizontal position vertical adjustment receiver support means disposed above said base wherein the entirety of said adjustment means overlies said base, and the upper side of said adjustment means receives said receiver; and,
    c. open front closure means disposed over said base and between said sidewalls and top adjustment strip means permitting partial closure of said open front whereby when the receiver is inserted in said cabinet on said adjustment means, and adjusted upwards or downwards in said cabinet, and said closure means frames said receiver, a floor console model is obtained.

2. The cabinet as defined in claim 1 wherein said open front closure means are frame means.

3. The cabinet as defined in claim 2 wherein said vertical adjustment receiver support means includes a plurality of adjustable thumbscrew means disposed perpendicularly between said supporting means and said receiver support means.

4. The cabinet as defined in claim 2 wherein said vertical adjustment receiver support means includes television retainer means mounted thereon.

5. A console cabinet for a portable television receiver, said cabinet comprising, in combination:
    a. a base, a top, open front and rear sides, and a pair of sidewalls attached to said base and terminating at said top;
    b. supporting means on said sidewalls for holding in a generally horizontal position vertical adjustment receiver support means disposed above said base wherein the entirety of said adjustment means overlies said base, and the upper side of said adjustment means receives said receiver;
    c. a plurality of guide means on said base and under said top for guiding flexible panel means in selective horizontal sliding movement over said base member and between said sidewalls and top to close at least a portion of said open front side and to engage side surfaces of said receiver; and,
    d. adjustment strip means disposed under said top to close the remaining portion of said open front side and to engage an upper surface of said receiver whereby when the portable receiver is inserted in said cabinet on said vertical adjustment means, and adjusted upwards or downwards in said cabinet, and said flexible panel means and adjustment strip means are engaged in position with said receiver, a floor console model is obtained.

6. The cabinet as defined in claim 5 wherein said vertical adjustment receiver support means includes a plurality of adjustable thumbscrew means disposed perpendicularly between said supporting means on said sidewalls and said receiver support means.

7. The cabinet as defined in claim 5 wherein said vertical adjustment receiver support means includes television receiver retainer means mounted thereon.

8. The cabinet as defined in claim 6 wherein said flexible panel means comprises a tambour.

9. The cabinet of claim 8 wherein the entire assembly is a molded or extruded plastic.

10. The cabinet of claim 8 wherein the entire assembly is wood.

* * * * *